United States Patent [19]
Martin

[11] Patent Number: 5,836,417
[45] Date of Patent: Nov. 17, 1998

[54] POWER STEERING FLUID

[75] Inventor: Jon W. Martin, Los Alamitos, Calif.

[73] Assignee: TRW Inc., Lyndhurst, Ohio

[21] Appl. No.: 581,775

[22] Filed: Jan. 2, 1996

[51] Int. Cl.$^6$ ........................................................ B62D 5/06
[52] U.S. Cl. ............................................ 180/417; 508/539
[58] Field of Search ............................ 180/400, 417, 180/418, 419, 420, 439; 508/539; 252/70, 74

[56] References Cited

U.S. PATENT DOCUMENTS

| | | | |
|---|---|---|---|
| 2,253,327 | 8/1941 | Delaval-Crow | 184/109 |
| 3,757,886 | 9/1973 | Hirao et al. | |
| 3,939,082 | 2/1976 | Williams et al. | 508/539 X |
| 4,276,812 | 7/1981 | Dymond | 91/467 |
| 4,525,286 | 6/1985 | Reick | 508/181 |
| 4,582,616 | 4/1986 | Kita et al. | 508/539 X |
| 4,615,408 | 10/1986 | Cordiano | |

*Primary Examiner*—Kevin Hurley
*Attorney, Agent, or Firm*—Tarolli, Sundheim, Covell, Tummino & Szabo

[57] ABSTRACT

A fluid power vehicle steering gear (10) comprises a tubular housing (22), a fluid (34) disposed within the tubular housing, and a member (20) movable relative to the housing in response to a change in the fluid pressure in the housing. The fluid comprises a mixture of a base oil and a grease. The weight of the grease in the mixture is about 0.1% to about 5% of the weight of the base oil in the mixture.

17 Claims, 2 Drawing Sheets

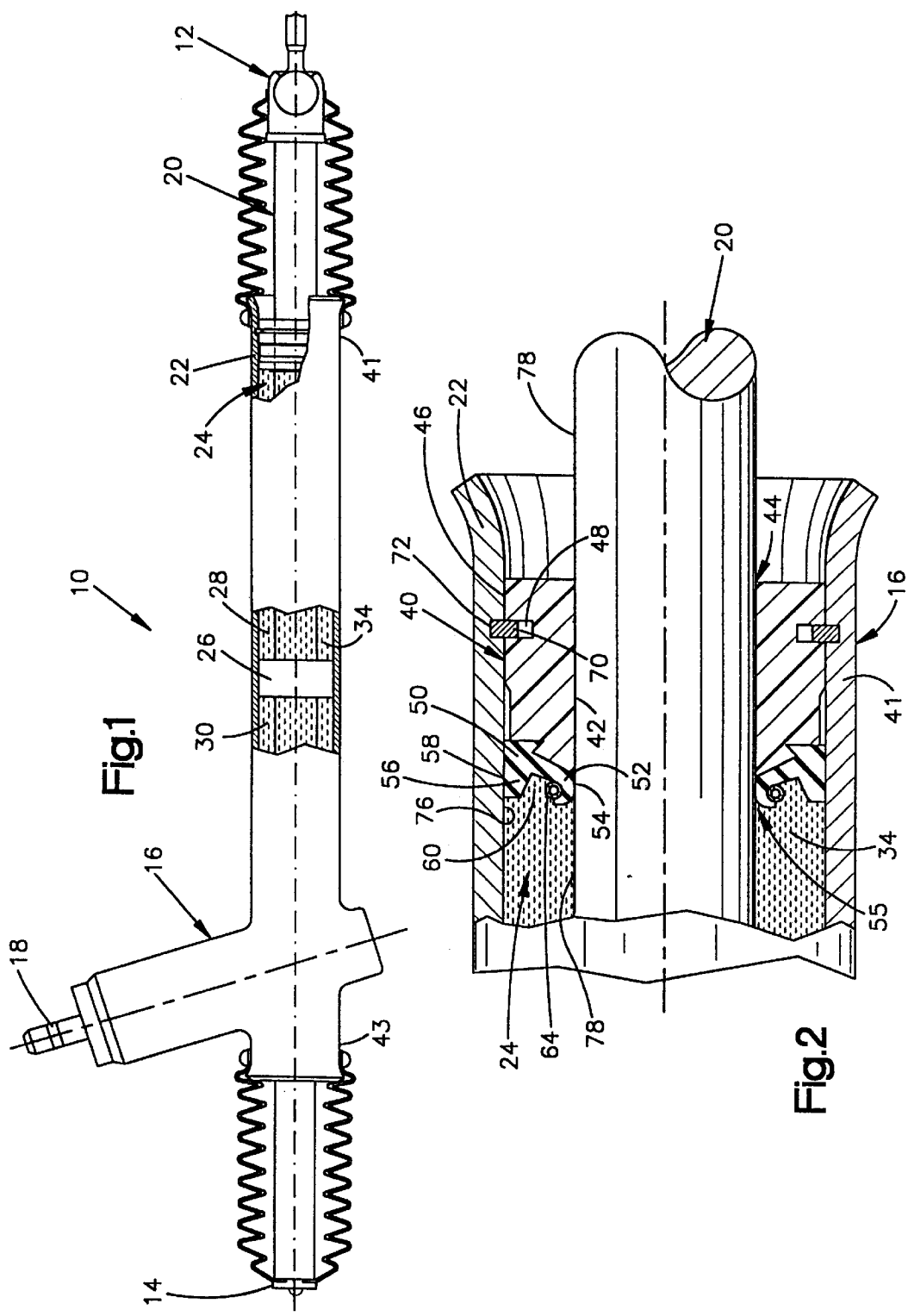

POWER STEERING FLUID

FIELD OF THE INVENTION

The present invention relates to a fluid power vehicle steering gear, and particularly to a power steering fluid for use in a fluid power vehicle steering gear.

BACKGROUND OF THE INVENTION

A fluid power rack and pinion vehicle steering gear commonly includes a rack which extends axially through a chamber. The ends of the rack project axially outward from the ends of the chamber. Steering linkage is connected to the projecting ends of the rack and to steerable wheels of the vehicle.

A piston is fixed to the rack within the chamber. Rotation of the vehicle steering wheel actuates a valve which causes power steering fluid under pressure to act against the piston. The force exerted by the fluid moves the piston within the chamber and moves the rack axially. Axial movement of the rack moves the steering linkage to turn the steerable wheels of the vehicle. The ends of the chamber through which the rack projects are sealed to prevent fluid leakage from the chamber. The power steering fluid used in most power steering systems is automatic transmission fluid (AFT).

SUMMARY OF THE INVENTION

The present invention relates to a fluid power vehicle steering gear. The gear comprises a tubular housing, a power steering fluid disposed within the tubular housing, and a member movable relative to the housing in response to a change in the fluid pressure in the housing. The power steering fluid comprises a mixture of a base oil and a grease. The amount of grease in the power steering fluid is an amount which weighs about 0.1% to about 8% of the weight of the base oil in the power steering fluid.

BRIEF DESCRIPTION OF THE DRAWINGS

The foregoing and other features of the present invention will become apparent to one skilled in the art to which the present invention relates upon consideration of the following description of the present invention with reference to the accompanying drawings, in which:

FIG. 1 is a schematic view of a power rack and pinion vehicle steering gear with parts cut away;

FIG. 2 is an enlarged view of a portion of FIG. 1 showing a rack bushing and seal assembly in the steering gear of FIG. 1.

DESCRIPTION OF A PREFERRED EMBODIMENT

Figure 3:
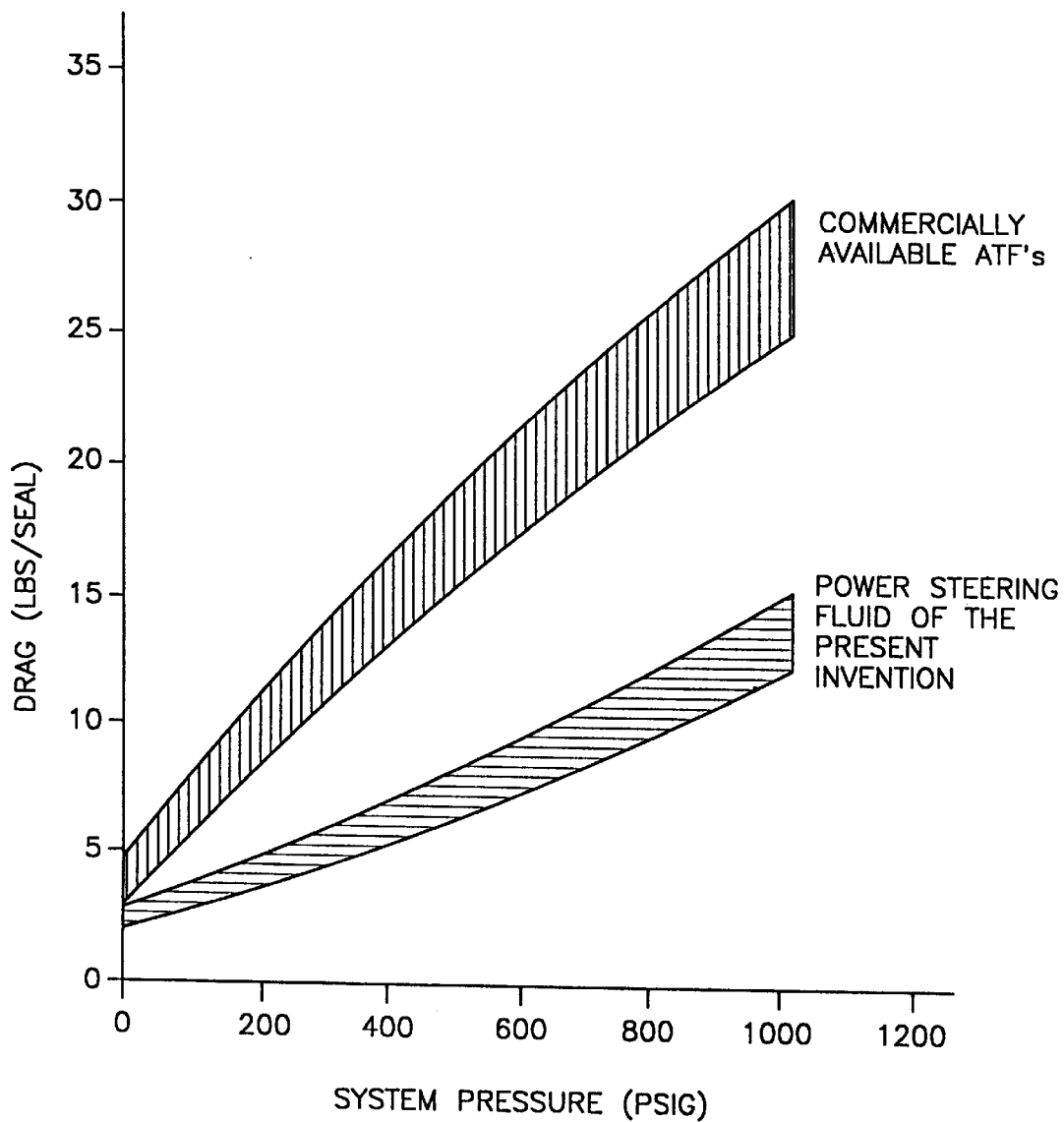
FIG. 3 is a graph showing the drag which exists between the rack and the rack bushing and seal of the assembly of FIG. 2 at different fluid pressures. The graph compares the fluid of the present invention with commercially available power steering fluids.

The present invention relates to a fluid power vehicle steering gear, and particularly to a power steering fluid for use in a fluid power vehicle steering gear. The present invention is applicable to various steering gear constructions. As representative of the present invention, FIG. 1 illustrates a fluid power rack and pinion vehicle steering gear 10. The steering gear 10 is connected with a pair of steerable vehicle wheels (not shown) in a known manner by steering linkage 12 at one end of the steering gear 10 and by steering linkage (not shown) at the opposite end 14 of the steering gear 10. The steering gear 10 is associated with a power steering pump (not shown) which when operating circulates power steering fluid through at least portions of the steering gear.

The steering gear 10 includes a housing 16, an input shaft 18, connected with a steering control valve (not shown) and with a pinion (not shown), and a rack 20. The rack 20 extends longitudinally through a tubular portion 22 of the housing 16. The tubular housing portion 22 partially defines a fluid chamber 24. A piston 26 is fixed to the rack 20 at an intermediate location. The piston 26 is located within the chamber 24. The piston 26 divides the chamber 24 into a first portion 28 and a second portion 30. The rack 20 is made from 1040 carbon steel, available from LTV Steel Co., and the tubular portion 22 of the housing 16 is made from 1018 carbon steel.

Upon rotation of a vehicle steering wheel (not shown), the input shaft 18 is rotated to actuate the steering control valve, and fluid 34 under pressure is directed against the piston 26, causing the rack 20 to move axially within the housing 16, as is well known. Axial movement of the rack 20 moves the steering linkage connected to the ends of the rack 20 thus turning the steerable wheels of the vehicle.

One or more annular bushings 40 (FIG. 2) support the rack 20 for axial movement within the tubular housing portion 22. The bushing 40 is positioned adjacent to end 41 of the tubular housing portion 22. A similar bushing is positioned at the opposite end 43 of the tubular housing portion 22. Each bushing 40 is preferably injection molded of a 45% glass reinforced polyester, such as Rynite® 545 polyester, which is available from E. I. Dupont de Nemours & Co. The bushing 40 has a cylindrical inner surface 42 which defines a passage 44 (FIG. 3) through the bushing 40. The bushing 40 also has a cylindrical outer surface 46. A snap ring groove 48 is formed in the outer surface 46 of the bushing 40.

An annular seal member 50 (FIG. 3) is connected with the bushing 40. The seal member 50 includes an inner seal portion 52 having a radially inner seal surface 54. The inner seal surface 54 defines a seal opening 55. The seal member 50 further includes and an outer seal portion 56 having a radially outer seal surface 58. An annular fluid receiving groove 60 is located between the inner seal portion 52 and the outer seal portion 56. The seal member 50 may be made of Viton® elastomer (trademark E. I. DuPont de Nemours & Co.), a hydrogenated nitrile elastomer or a conventional nitrile elastomer.

A circular garter spring 64 is located in the fluid receiving groove 60 in the seal member 50. The garter spring 64 engages a radially outward facing surface of the inner seal portion 52 of the seal member 50. The garter spring 64 presses the inner seal portion 52 of the seal member 50 radially inward against the rack 20. The garter spring 64 is a commercially available known item.

A snap ring 70 is received in the groove 48 in the bushing 40 and in a groove 72 in the housing portion 22. The snap ring 70 retains the bushing 40 and the seal 50 in a set position in the housing portion 22. The snap ring 70 is a commercially available steel part available from Spiralock Company.

In the assembled condition, the outer seal surface 58 of the seal member 50 sealingly engages an inner surface 76 of the housing portion 22. The inner seal surface 54 of the seal member 50 sealingly engages a cylindrical outer surface 78 of the rack 20. The garter spring 52 assists in pressing the inner seal surface 54 against the outer surface 78 of the rack 20. The fluid 34, under pressure in the chamber 24, urges the outer seal portion 56 radially outward and the inner seal portion 52 radially inward to assist in sealing. Because of the sealing engagement between the seal member 50 and the tubular housing portion 22 on the one hand, and between the seal member 50 and the rack 20 on the other hand, the fluid 34 cannot flow axially out of the chamber 24 past the seal member 50. The rack 20 passes axially through the passage 44 in the bushing 40 and through the seal opening 55 of the seal member 50. The seal member 50 and bushing 40 are merely examples of a rack support and seal that may be used in the steering gear. Other, structurally different rack supports and seals could be used in the steering gear.

The fluid 34 comprises a mixture of a grease and a base oil. Preferably, the weight of grease in the fluid 34 is about 0.1% to about 8% of the weight of the base oil. In a preferred composition of the power steering fluid 34 of the present invention, the weight of the grease in the power steering fluid is 1% of the weight of the base oil.

The base oil can comprise a mineral oil or a synthetic oil. The base oil can also have suitable additives to impart desired fluid characteristics to the base oil. A preferred base oil is a conventional automatic transmission fluid (ATF). Typically, an ATF consists of about 90 mass percent of mineral oil and about 10 mass percent of one or more suitable additives to impart desired fluid characteristics to the mineral oil. Examples of commonly used additives are dispersants, corrosion inhibitors, antiwear agents, friction modifiers, antioxidants, pour point depressants, foam inhibitors, viscosity index improvers, and red dye.

The grease of the present invention is a semi-solid mixture which comprises a combination of an oil (hereinafter referred to as "grease-oil") and a soap. A preferred grease-oil is a mineral oil. A synthetic oil can also be the grease-oil. A preferred soap is a metallic soap of a fatty acid, preferably a lithium soap, such as a lithium stearate. A preferred lithium stearate is lithium 12-hydroxystearate. The soap could also be an oleate. The soap functions in the grease-oil as a lubricant and a thickener.

The metallic portion of the soap can also be a metal such as calcium, sodium, aluminum, barium and lead. The weight of the soap in the grease is about 7% to about 35% of the weight of the grease-oil.

In addition to the grease-oil and the soap, the grease of the present invention may contain small amounts of such ingredients as asphalt, petroleum, antiwear agents, antioxidants, foam inhibitors, mineral wax, rosin, dyeing and perfuming substances, and inorganic materials, including graphite, and other nonabrasive solids, as is well known in the art.

The operating temperature within the power steering gear 10 varies over a wide range with changes in ambient temperature, but generally is less than 175° C. Thus, grease should have a decomposition temperature well above 175° C.

The fluid 34 is made by blending the desired amount of grease with the base oil using intensive mixing. This breaks up the grease into a large number of small particles. The mixing therefore is effective to disperse the grease particles uniformly through the base oil.

Grease is insoluble in the base oil and the grease particles and base oil have approximately the same specific gravity. Thus, the grease particles, once dispersed in the base oil, remain substantially uniformly suspended and dispersed for a time. Some coagulation of grease particles or setting may occur during non-operational periods of the steering gear. However, the starting-up of the power steering pump (not shown), which is associated with the steering gear, causes circulation of the fluid 34 and causes a substantially uniform redispersion of the grease particles in the base oil.

The following example illustrates the present invention.

EXAMPLE

A number of specimens of the power steering fluid according to the present invention were prepared. A number of commercially available ATF's used as power steering fluids were also obtained.

The specimens of the present invention consisted of a base oil fluid marketed by Royal Lubricants under the trademark RTK-11 and 1% of a grease. The grease was a commercial grease marketed by Shouwa under the trademark SUN LIGHT. An analysis of the grease showed that it consisted primarily of 93% of mineral oil and about 7% of lithium 12-hydroxystearate soap. The grease has a decomposition temperature, as determined in a differential calorimeter, of about 230° C., well above the maximum operating temperatures of 175° to which it could be exposed in a power steering gear.

The power steering fluid specimens of the present invention and the commercially available ATF's were tested in a test apparatus similar to the steering gear of FIG. 1. The apparatus comprised a cylinder, a 23 mm diameter metal shaft reciprocatable in the cylinder, and two production seals at the ends of the cylinder through which the shaft projected. The apparatus was coupled to an Instron Tensile Testing Machine Model No. 1122, manufactured by the Instron Engineering Corporation of Canton, Mass. The resistance force (drag) was measured at different pressures within the apparatus cylinder in the range of zero psig to 1,000 psig.

The results are provided in FIG. 3. As can be seen in FIG. 3, the resistance force or drag experienced using the power steering fluid of the present invention was consistently about one-half or less than that experienced using the commercially available ATF's. For instance, at 600 psig, the resistance force or drag experienced with the commercially available ATF's was in range of about 17 to about 22 lbs. By comparison, the resistance force or drag with the power steering fluid of the present invention was in the range of about 7 to about 10 lbs.

It is believed that the power steering fluid 34 of the present invention produces less drag in a power steering gear than the commercially available ATF's because the fluid 34 thinly coats the surfaces 78 and 54 of the rack 20 and the seal 50. The grease added to the base oil increases the lubricity of the fluid 34. Thus, when the rack 20 moves through the seal opening 55, less friction is created between surfaces 54 and 78. Because there is less friction between the surfaces 54 and 78, there is less resistance force or drag.

From the above description of the present invention, those skilled in the art will perceive improvements, changes and modifications in the invention. Such improvements, changes and modifications within the skill of the art are intended to be covered by the appended claims.

Having described the invention, I claim:

1. A fluid power vehicle steering gear comprising:
   a tubular housing;
   a fluid disposed within said tubular housing; and
   a member movable relative to said housing in response to a change in the fluid pressure in said housing;
   said fluid comprising a mixture of a base oil and a grease, the weight of the grease in said fluid being about 0.1% to about 8% of the weight of the base oil in said fluid.

2. The fluid power vehicle steering gear of claim 1 wherein said base oil is a mineral oil.

3. The fluid power vehicle steering gear of claim 2 wherein said grease comprises a grease-oil and a metallic soap.

4. The fluid power vehicle steering gear of claim 3 wherein said metallic soap is lithium 12-hydroxystearate.

5. The fluid power vehicle steering gear of claim 1 wherein said base oil is an automatic transmission fluid.

6. The fluid power vehicle steering gear of claim 5 wherein said grease comprises a grease-oil and a metallic soap.

7. The fluid power vehicle steering gear of claim 6 wherein said metallic soap is lithium 12-hydroxystearate.

8. The fluid power vehicle steering gear of claim 1, further including a seal disposed in said housing and having an opening therein, said member being movable axially through said seal opening.

9. The fluid power vehicle steering gear of claim 8, wherein said member is a rack connectible with vehicle steering linkage.

10. The fluid power vehicle steering gear of claim 9 wherein said seal has a sealing surface engaging said rack.

11. A power steering fluid for a fluid power steering gear which includes a tubular housing, and a member movable relative to the housing in response to a change in the fluid pressure in the housing, the fluid comprising a mixture of a base oil and a grease, the weight of the grease in the mixture being about 0.1% to about 8% of the weight of the base oil in the mixture, the grease being insoluble in the base oil.

12. The fluid of claim 11 wherein said base oil is a mineral oil.

13. The fluid of claim 12 wherein said grease comprises a grease-oil and a metallic soap.

14. The fluid of claim 13 wherein said metallic soap is lithium 12-hydroxystearate.

15. The fluid of claim 11 wherein said base oil is an automatic transmission fluid.

16. The fluid of claim 15 wherein said grease comprises a grease-oil and a metallic soap.

17. The fluid of claim 16 wherein said metallic soap is lithium 12-hydroxystearate.

* * * * *